United States Patent [19]

Gillot

[11] 4,438,912

[45] Mar. 27, 1984

[54] SWIVELLING DEVICE FOR SUPPORTING A LARGE-SIZE PART IN THE FORM OF A SPHERICAL DOME

[75] Inventor: Georges Gillot, Le Creusot, France

[73] Assignee: Framatome, Courbevoie, France

[21] Appl. No.: 323,637

[22] Filed: Nov. 20, 1981

[30] Foreign Application Priority Data

Dec. 8, 1980 [FR] France .............. 80 25976

[51] Int. Cl.³ .................................. B23Q 1/06
[52] U.S. Cl. .......................... 269/55; 269/289 R; 269/104; 248/346; 108/1
[58] Field of Search .......... 269/289 R, 55, 104; 108/1, 12, 19; 248/178, 179, 143, 346, 349; 343/757, 763, 765, 767, 878, 885

[56] References Cited

U.S. PATENT DOCUMENTS

| | | | |
|---|---|---|---|
| 1,288,193 | 12/1918 | Reed | 248/143 |
| 2,481,724 | 9/1949 | Croteau | 108/1 X |
| 3,331,072 | 7/1967 | Pease | 343/765 |
| 3,392,398 | 7/1968 | Bowditch | 343/765 |
| 3,530,477 | 9/1970 | Jarrett et al. | 343/765 |
| 3,546,704 | 12/1970 | Selby et al. | 343/765 |
| 3,713,164 | 1/1973 | Foury | 343/766 |

Primary Examiner—Robert C. Watson
Assistant Examiner—Steven P. Schad
Attorney, Agent, or Firm—Pollock, Vande Sande & Priddy

[57] ABSTRACT

A swivelling device for supporting a large-size part in the form of a spherical dome, including a supporting structure (1) in the form of a truncated pyramid contriving at least five bearing surfaces one of which corresponds with the small base of the truncated pyramid and the others with its side faces. A crown (12) for support and attachment of the spherical dome (18) is connected to the supporting structure (1) by way of a connecting structure (10-11). The axis of the truncated pyramid coincides with the axis of the crown (12) and the spherical dome (18) is placed on the crown (12) with its axis along this common direction. Different orientations of the dome (18) may be obtained by resting the device upon the different bearing surfaces of the structure (1). The device is useful in particular for the support of domed ends of pressurized-water nuclear reactor vessels upon which work of welding or building up is being carried out.

5 Claims, 3 Drawing Figures

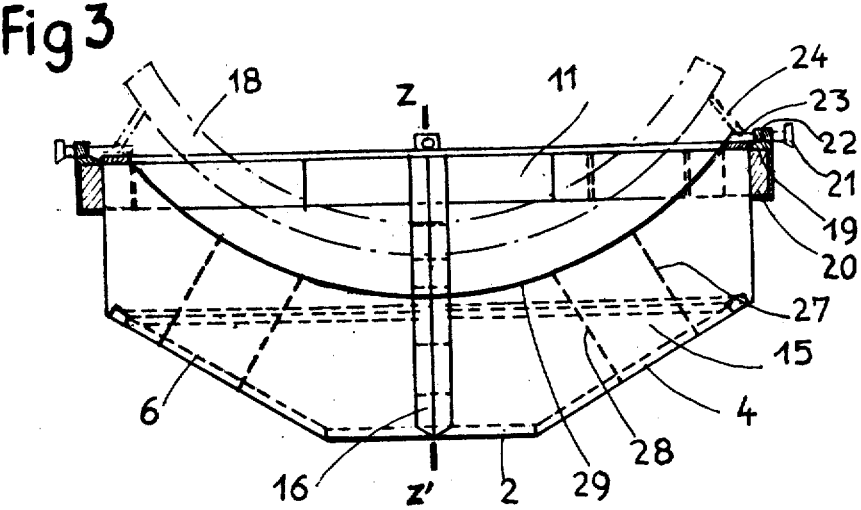
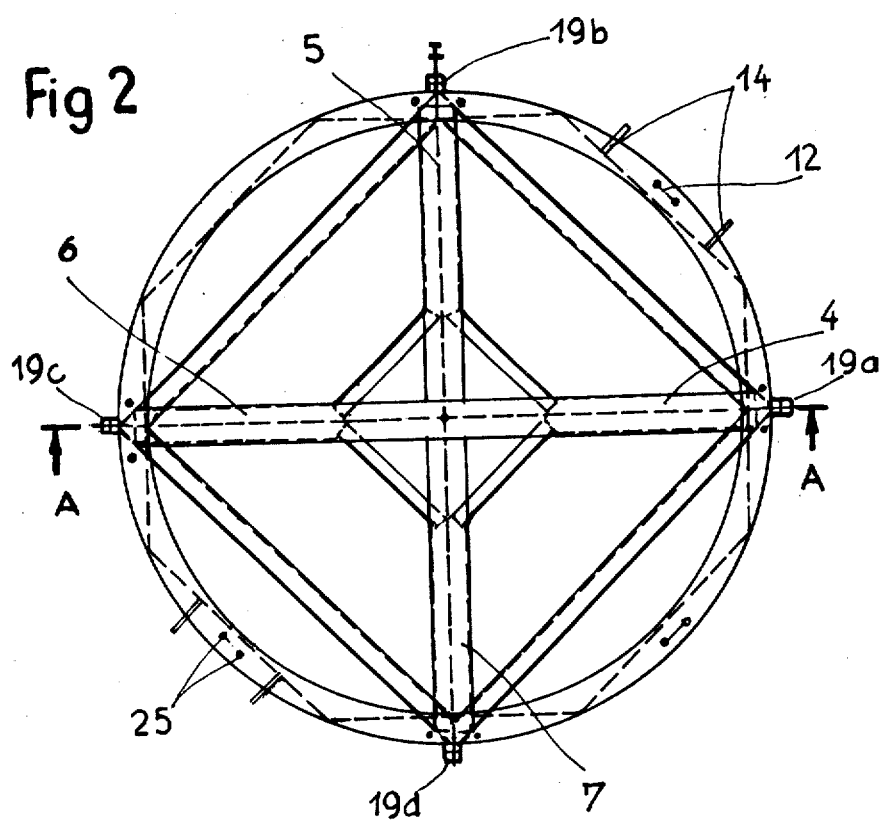

SWIVELLING DEVICE FOR SUPPORTING A LARGE-SIZE PART IN THE FORM OF A SPHERICAL DOME

FIELD OF THE INVENTION

The invention refers to a swivelling device for supporting a large-size part in the form of a spherical dome upon which operations are carried out, such as welding or building up.

BACKGROUND

During the course of manufacture of pressurized-water nuclear reactor vessels, it is necessary to carry out certain machining or welding operations on the bottom or top ends of these vessels, consisting of spherical domes of large size and considerable mass.

For example, it is necessary to incorporate instrumentation tubes into the bottom end of the vessel and adaptors for control rod mechanisms into its top end, holes for passing through these tubes or adaptors being provided in the spherical ends of the vessel.

The incorporation of these components necessitates welding of the tube or adaptor into the spherical end at the place where it is made to pass through.

However, it is not possible to weld the tube directly onto the spherical end and it is necessary to place a relatively thick deposit of a joint metal on the portions of the spherical end surrounding the passage. Hence, facings which have certain profiles are machined, and a layer consisting of a nickel alloy of small thickness is deposited thereon.

This localized building-up of the spherical end, called buttering, can be carried out under satisfactory conditions only if the deposit is carried out in a customary welding position. This welding or building up may be effected, for example, on the flat or like a ledge.

The distribution of the facings of which it is required to provide the buttering on the inner face of the spherical dome necessitates a modification of the orientation of this dome according to the location of the facing being worked upon.

Hence it has been proposed to place the spherical dome on a handling device consisting of a table which can turn and tilt, so that its positions can be varied as the buttering work proceeds upon the several facings. For this purpose, the spherical dome is attached to the plate of the device by way of a frusto-conical skirt attached to the dome and to the plate upon which it is resting.

As the spherical ends of nuclear reactor vessels have very large masses and the tilting torques for obtaining all of the working positions are very high, it is necessary to employ handling devices or positioners of great power. It is necessary, for example, in the case of the spherical ends of nuclear reactor vessels being constructed at present, to have available positioners capable of developing a torque of 50 tone/m at a minimum.

Moreover, it is necessary in a workshop for the manufacture of nuclear reactor vessels to have available a fairly large number of positioners' in order to avoid saturation of these installations upon which the spherical ends must remain for a relatively long period in order to carry out all of the necessary welding and building-up operations.

SUMMARY OF THE INVENTION

The object of the invention is a swivelling device for supporting a large-size part in the form of a spherical dome upon which operations such as welding or building-up are carried out, this device being of simple and relatively inexpensive construction and enabling extremely reliable retention of the parts in position, whatever their orientation.

To achieve this object, the supporting device in accordance with the invention includes:

a supporting structure in the form of a truncated pyramid having polygonal bases and consisting of metal sections welded together, arranged along the direction of the edges of the truncated pyramid and contriving at least five bearing surfaces one of which corresponds with the small base of the truncated pyramid and the other with its side faces;

a crown for support and attachment of the spherical dome including means for centering and attachment of this dome onto the crown; and a connecting structure which assures a rigid union between the large base of the supporting structure and the supporting crown, so that the height of the truncated pyramid forming the supporting structure coincides with the axis of the supporting crown, i.e., the straight line perpendicular to this crown and passing through its center, the spherical dome being placed on the supporting crown with its axis directed along the axis of this crown and its convex portion being directed towards the supporting structure so that it may be swivelled in different directions by letting the supporting device rest upon a horizontal surface by way of its various bearing surfaces.

In order that the invention may be more clearly understood there will now be described by way of non-restrictive example with reference to the accompanying drawings, an embodiment of a supporting device in accordance with the invention, which can be employed in a workshop for manufacture of pressurized-water nuclear reactor vessels.

BRIEF DESCRIPTION OF THE DRAWINGS

FIG. 2 represents a plan of the supporting device resting on the ground by way of the small base of the truncated pyramid.

FIG. 3 represents a section along line A—A in FIG. 2.

DETAILED DESCRIPTION

Figure 1:
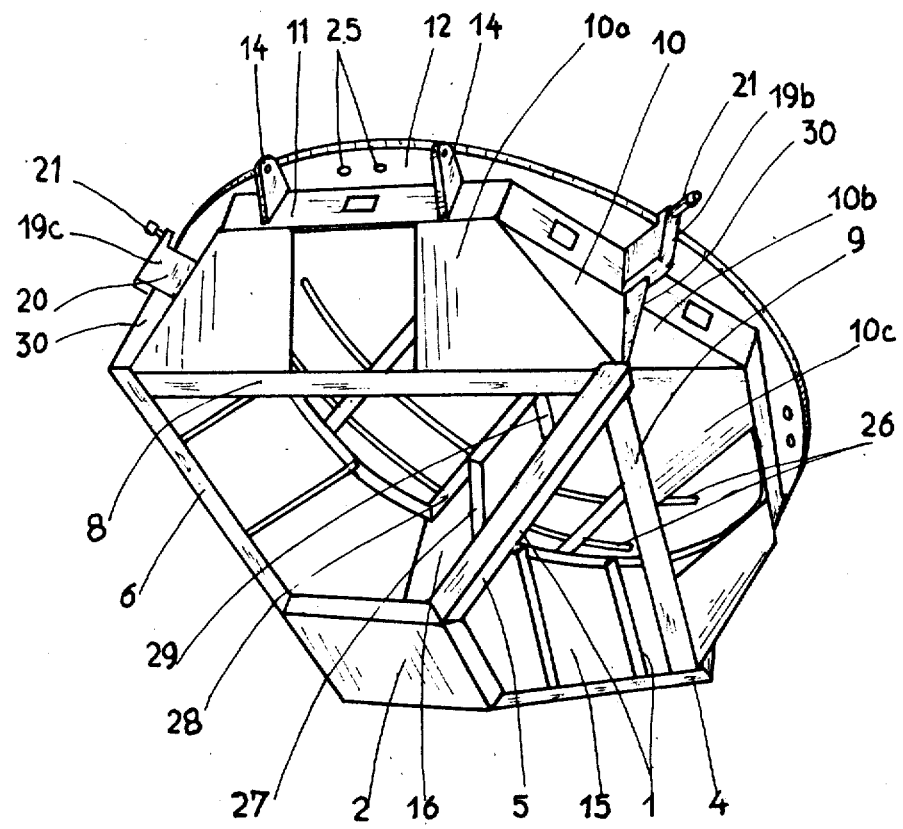
FIG. 1 represents the supporting device in perspective, this supporting device resting upon the floor of the workshop by way of one of the side faces of a truncated pyramid.

FIGS. 1, 2 and 3 show the supporting structure 1 of the supporting device, consisting of a set of angle irons welded together and directed along the edges of a truncated pyramid having square bases, the small base 2 of which forms a bearing surface created by a plane metal sheet welded to the angle irons arranged along the sides of the small base of the truncated pyramid.

The structure 1 includes four trapezoidal side faces which are likewise bearing surfaces for this structure and for the supporting device.

In FIG. 1 the supporting device has been represented in a position in which the bearing surface is one of the side faces.

Along the sides of these side faces, which are not parallel with one another, are arranged angle irons 4,5,6 and 7 connecting the angle irons forming the small base to the angle irons such as 8 and 9 which form the large base of the bearing structure in the form of a truncated pyramid.

Onto each of the pairs of angle irons such as 8 and 9 there is again fixed a reinforcing corner-iron 10 consisting of a metal sheet folded and welded to carry three plane faces such as 10a, 10b and 10c for the reinforcement 10.

Four reinforcing pieces similar to the reinforcing piece 10 are attached to each of the angles of the large base of the bearing structure 1.

The various faces of the reinforcing pieces similar to the piece 10 enable the connection between the square base of the supporting structure 1 and a prismatic girdle 11 having an octagonal base.

The girdle 11 is attached by welding to the reinforcing pieces 10. This assembly 10,11 forms the connecting structure between the large base of the supporting structure and a crown 12 which serves for the support and the attachment of the spherical dome. The cross-section of the prismatic girdle 11 inscribes the inner circular perimeter of the crown 12.

Handling ears 14 attached to the prismatic girdle 11 enable transport and the movement of the supporting device from one bearing position to another.

The supporting structure 1 has high rigidity, thanks to two cross braces 15,16 arranged perpendicularly to one another, the cross brace 15 being welded to the angle irons 4 and 6 and the cross brace 16 to the angle irons 5 and 7. The cross braces are themselves reinforced by angle irons such as 27,28 and 29.

The supporting crown 12 is attached by welding to the upper portion of the cross braces 15 and 16.

The crown 12 is furthermore attached by welding to the upper portion of the prismatic girdle 11.

The crown 12 includes means of centering and attachment of the spherical end 18 represented in FIG. 3 in position on its support.

The centering means consist of stops 19 attached to the crown 12 by way of reinforcing pieces 20 welded onto the latter and of a cross bracing plate 30 welded to the face 10b of the corresponding reinforcement 10.

The stops 19a, 19b, 19c and 19d are placed symmetrically with repect to the axis of the supporting device which coincides with the height of the truncated pyramid forming the supporting structure and with the axis of the crown 12, i.e., the straight line perpendicular to this crown, passing through its center.

When the spherical dome 18 is in position on the supporting device as represented in FIG. 3, the axis Z—Z' of this spherical dome coincides with the axis of the supporting device.

In order to obtain the centering of the spherical dome 18, centering screws 21 are employed, each located in a tapped hole 22 arranged in the stop 19 and in contact by its inner end with the support 23 of the skirt 24 attached to the spherical end 18.

In addition, holes 25 are provided in the crown 12 and when centering of the spherical end 18 has been achieved, the corresponding holes provided in the support 23 come into alignment with the holes 25.

The spherical dome 18 may then be attached to the crown 12 by means of bolts which are engaged in the holes which have come into alignment, or by means of dowels which substitute for the bolts.

In order to swivel the spherical dome 18 into a direction which enables buttering to be carried out of the facings machined in a particular zone of the inner surface of this dome, it is sufficient to place the supporting device on the floor of the workshop by way of one of the bearing surfaces of the truncated pyramid structure, which is chosen especially in order to carry out the building-up under satisfactory conditions.

In short, the slope of the faces of the truncated pyramid with respect to one another is chosen so that the position bearing against each of these faces corresponds with a location of the spherical end which is adequate for carrying out the buttering of the facings on one portion of the end.

By resting the supporting device on each of the bearing surfaces in succession, buttering may be carried out of the whole of the facings machined on the inner surface of the spherical end 18.

Repositioning of the supporting device may be effected by means of an overhead crane, on which the structure may be slung by means of handling ears 14.

In order to carry out the work of buttering the facings, it may be necessary to preheat the spherical end and to subject it to certain heat treatments.

Hence there are attached to the supporting structure curved rows 26 of gas heating jets, which enable the spherical end to be heated from the side of its convex face directed towards the supporting structure.

The main advantages of the device in accordance with the invention are its simplicity of production and use, resulting in reduction in investment and cost of manufacture of the components of nuclear reactor vessels, as well as enhanced safety during operations carried out upon the spherical end, since the various orientation positions are totally stable.

Thus a sufficient number of these simple and cheap devices in a workshop for manufacture of nuclear reactor vessels obviates the employment, partially or even completely, of handling devices which are more complicated and of higher cost.

The invention is not restricted to the embodiment which has just been described; it includes on the contrary any variant.

Thus one may conceive of a connecting structure between the supporting structure and the supporting crown, which differs in form from that which has been described.

One may conceive of a connection between this structure and the crown by way of a surface which differs from a prismatic surface having an octagonal cross-section.

The supporting structure may have square, rectangular or polygonal bases with any number of sides.

One may equally well conceive of the employment of profiles of any cross-section for forming the supporting structure 1.

One may equally well conceive of means of centering and attachment of the spherical end onto the crown other than those described.

The spherical end may rest on the supporting crown not only by way of a frusto-conical skirt 24 and a bearing sole 23, but by way of any bearing device, or else directly without any intermediate bearing device, if a bearing surface of required shape is provided on the supporting crown.

Instead of rows of jets for gas heating, one may employ for the preheating of the spherical end, electrical heating means of a form suited to the outer convex surface of the spherical dome.

I claim:

1. A swivelling device for supporting a large-size object (18) in the form of a spherical dome upon which operations are carried out, comprising:
   (a) a supporting structure (1) in the form of a truncated pyramid having polygonal large and small bases and consisting of metal sections (4, 5, 6, 7, 8, 9) welded along the direction of the edges of said pyramid, said structure having a plurality of bearing surfaces one of which constitutes the small base of said pyramid and the others its side faces;
   (b) a crown (12) for support and attachment of said dome (18) including means (19, 25) for centering and attachment of said dome (18) onto said crown (12); and
   (c) a connecting structure (10, 11) for assuring a rigid union between the large base of said pyramid (1) and said crown (12) so that the central axis of said pyramid (1) coincides with the central axis of said crown (12), said large base located adjacent said crown (12), said dome (18) being placed on said crown (12) with its axis directed towards said supporting structure (1), whereby it may be swivelled in different directions by letting said supporting device rest upon a horizontal surface by way of its various bearing surfaces.

2. A swivelling device according to claim 1, wherein said pyramid (1) has a square base.

3. A swivelling device according to claim 1, wherein said connecting structure includes a polygonal girdle (11) which is connected by welding to said crown (12) for support and attachment of said dome (18).

4. A swivelling device according to claim 3, wherein said girdle (11) has an octagonal cross-section which inscribes the inner perimeter of said crown (12) for support and attachment.

5. A swivelling device according to any one of claims 1 to 4, wherein said dome (18) is integral with a supporting structure including a frusto-conical skirt (24) coaxial with said dome and with plane surfaces (23) integral with said skirt (24), said dome (18) being attached to said crown by fasteners introduced into holes in said bearing surfaces (23) of said dome (18) and said crown (12) upon their alignment by centering means (19, 22) consisting of screws engaged in tapped holes provided in centering pieces carried by said crown and arranged symmetrically with respect to the axis of said crown.

* * * * *